United States Patent
Liu et al.

(10) Patent No.: US 8,285,885 B2
(45) Date of Patent: Oct. 9, 2012

(54) UNIVERSAL SERIAL BUS DEVICE AND UNIVERSAL SERIAL BUS SYSTEM

(75) Inventors: Meng-Fan Liu, Taipei (TW); Yu-Lung Lin, Taipei (TW)

(73) Assignee: Via Technologies, Inc., Hsin-Tien, Taipei (TW)

( * ) Notice: Subject to any disclaimer, the term of this patent is extended or adjusted under 35 U.S.C. 154(b) by 137 days.

(21) Appl. No.: 12/512,142

(22) Filed: Jul. 30, 2009

(65) Prior Publication Data

US 2010/0312929 A1    Dec. 9, 2010

(30) Foreign Application Priority Data

Jun. 8, 2009  (TW) ................................ 98118994 A

(51) Int. Cl.
  *G06F 3/00*    (2006.01)
  *G06F 13/00*    (2006.01)
(52) U.S. Cl. ..................... 710/15; 710/5; 710/8; 710/33
(58) Field of Classification Search .......................... None
  See application file for complete search history.

(56) References Cited

U.S. PATENT DOCUMENTS

| | | | |
|---|---|---|---|
| 2006/0061795 A1* | 3/2006 | Walmsley | 358/1.14 |
| 2007/0210842 A1* | 9/2007 | Kawamoto | 327/158 |

FOREIGN PATENT DOCUMENTS

CN    1310402    8/2001

OTHER PUBLICATIONS

USB Made Simple, 2006, MQP Electronics, [online, accessed on Jan. 17, 2011], URL:http://www.usbmadesimple.co.uk.*
CN Office Action mailed Feb. 12, 2010.
English abstract of CN1310402, pub. Aug. 29, 2001.

* cited by examiner

*Primary Examiner* — Scott Sun
(74) *Attorney, Agent, or Firm* — Thomas|Kayden

(57) ABSTRACT

A universal serial bus (USB) device and a USB system are provided. The USB device comprises an electrical physical layer (EPHY) module, a logical physical layer (LPHY) module and a link layer module. The EPHY module reads the voltages of first and second transmission lines of a USB cable to extract a recovery clock and data. The LPHY module detects the recovery clock and data to output an indication signal. When the recovery clock is not detected, the LPHY module sets the indication signal to a predetermined value. The link layer module determines whether the indication signal is at the predetermined value, and makes a state machine thereof leave a normal operation state when the indication signal has been maintained at the predetermined value over a predetermined time period.

18 Claims, 5 Drawing Sheets

UNIVERSAL SERIAL BUS DEVICE AND UNIVERSAL SERIAL BUS SYSTEM

CROSS REFERENCE TO RELATED APPLICATIONS

This Application claims priority of Taiwan Patent Application No. 98118994, filed on Jun. 8, 2009, the entirety of which is incorporated by reference herein.

BACKGROUND OF THE INVENTION

1. Field of the Invention

The present invention relates to universal serial bus (USB) techniques, and in particular relates to USB 3.0 techniques.

2. Description of the Related Art

FIG. 1 shows a block diagram of a USB system. As shown, the USB system comprises a host 102, a USB device 104 and a USB cable 106. The USB cable 106 connects the USB device 104 to the host 102, and the transmission protocol is a USB 3.0 protocol.

When normally operating, both the host 102 and the USB device 104 are in a normal operation state (a U0 state). In the U0 state, the host 102 and USB device 104 receive or transmit data packages normally. Also, a user can disable the USB transmission from the host 102 side. For example, the operation system (OS) of the host 102 may provide a command, "removing the USB device", to disable the USB transmission of the host 102.

However, for conventional techniques, when the USB transmission is disabled from the host 102 side, the USB device 104 side is not notified of the change of the operation state of the host 102. Thus, the USB device 104 continues to operate in the normal operation state (U0 state), consuming unnecessary power.

BRIEF SUMMARY OF THE INVENTION

The invention discloses USB devices and systems comprising at least one of the USB devices.

A USB system comprises a host, a USB device and a USB cable connecting the USB device to the host.

A USB device comprises an electrical physical layer (EPHY) module, a logical physical layer (LPHY) module, a link layer module and a protocol layer module. The LPHY module and the link layer module are specially designed in the invention.

In an exemplary embodiment of the invention, the EPHY module reads the voltages of a first transmission line and a second transmission line of the USB cable to extract a recovery clock and data. The LPHY module detects the recovery clock and data to output an indication signal. When no recovery clock is available, the LPHY module sets the indication signal to be a predetermined value. The link layer module, comprising a state machine, detects the indication signal and, when the detected result shows that the indication signal has been maintained at the predetermined value over a predetermined time period, the link layer module makes the state machine leave a normal operation state (a U0 state).

The first and second transmission lines may be TX+ and TX− transmission lines of the USB cable.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description shows several exemplary embodiments carrying out the invention. This description is made for the purpose of illustrating the general principles of the invention and should not be taken in a limiting sense. The scope of the invention is best determined by reference to the appended claims.

Figure 1:
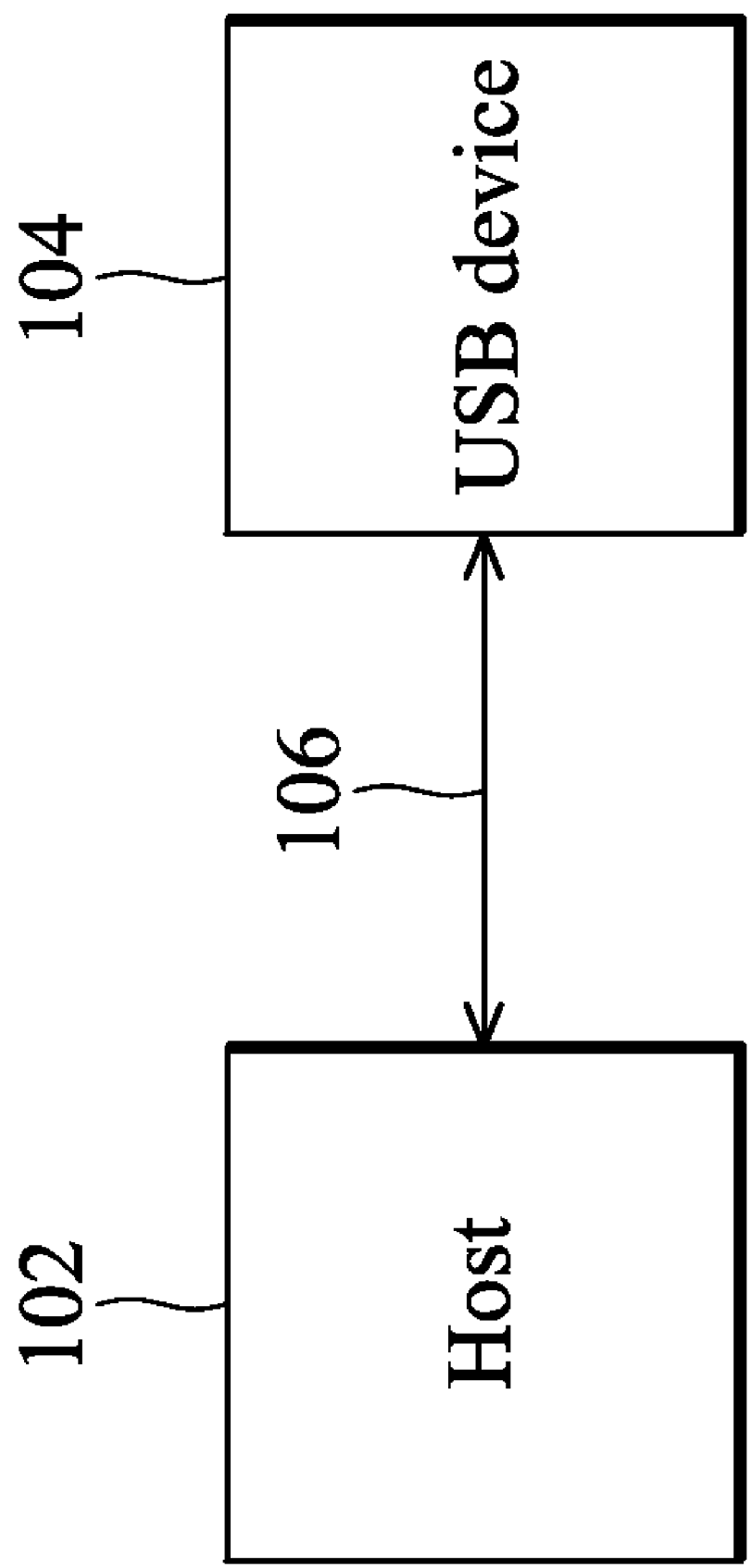
FIG. 1 shows a block diagram of a USB system.
Figure 2:
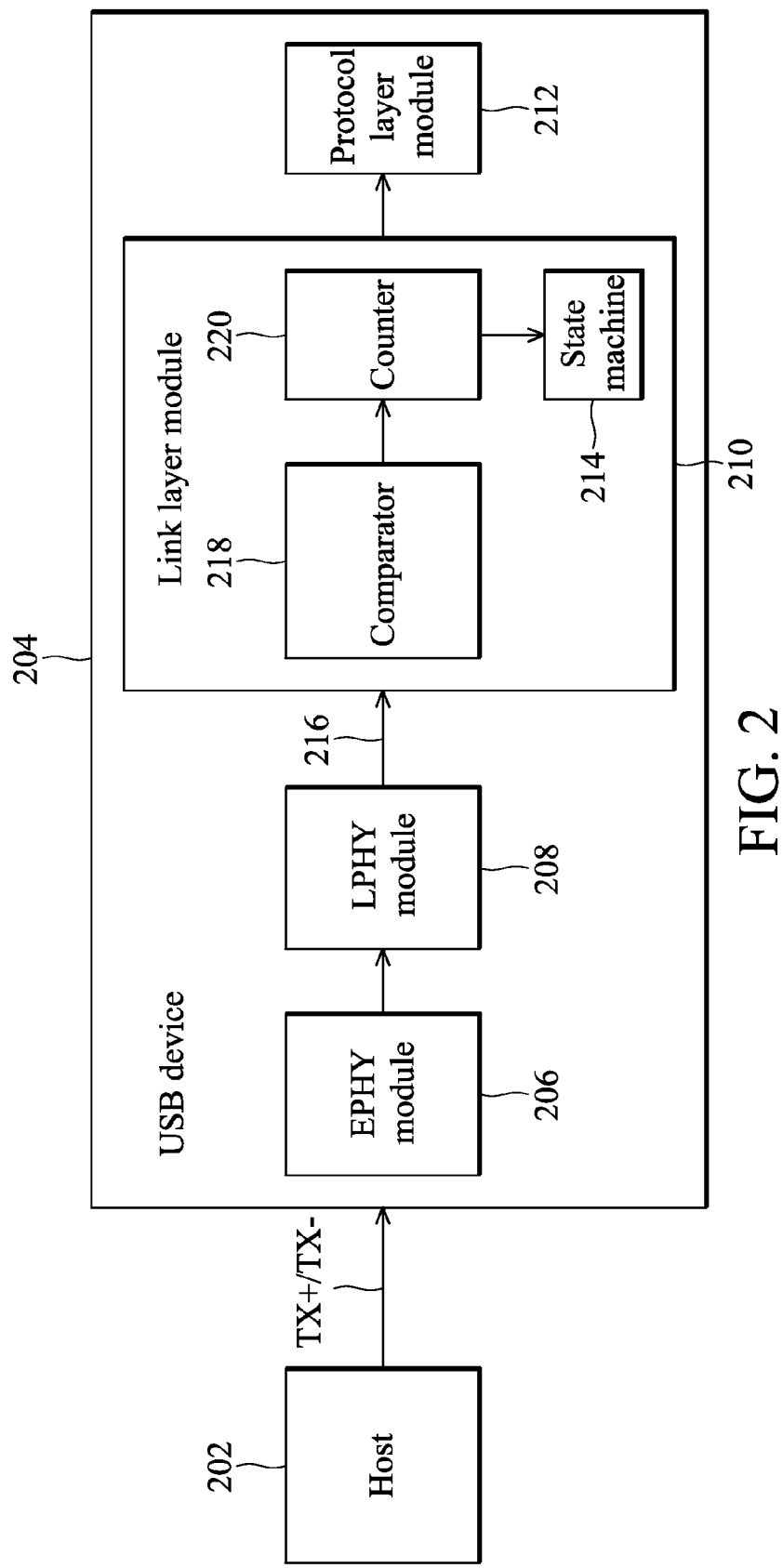
FIG. 2 is a block diagram depicting a USB system according to the invention.

FIG. 2 is a block diagram depicting a USB system according to the invention, wherein the transmission technique used is a USB 3.0 technique. The USB system comprises a host 202, a USB device 204 and a USB cable connecting the USB device 204 to the host 202. The USB cable comprises a plurality of transmission lines and, for simplicity, only TX+ and TX− transmission lines thereof are shown in FIG. 2.

The USB device 204 comprises an electrical physical layer (EPHY) module 206, a logical physical layer (LPHY) module 208, a link layer module 210 and a protocol layer module 212. The link layer module 210 comprises a state machine 214, such as a link training and status state machine (LTSSM) of a USB 3.0 protocol, which defines link connectivity and link power management. In an embodiment of the invention, the LPHY module 208 and the link layer module 210 are specially designed to show the status of the TX+ and TX− transmission lines. The invention improves flexibility of controlling the state machine 214 and improves power management of a USB device 204.

Figure 3:
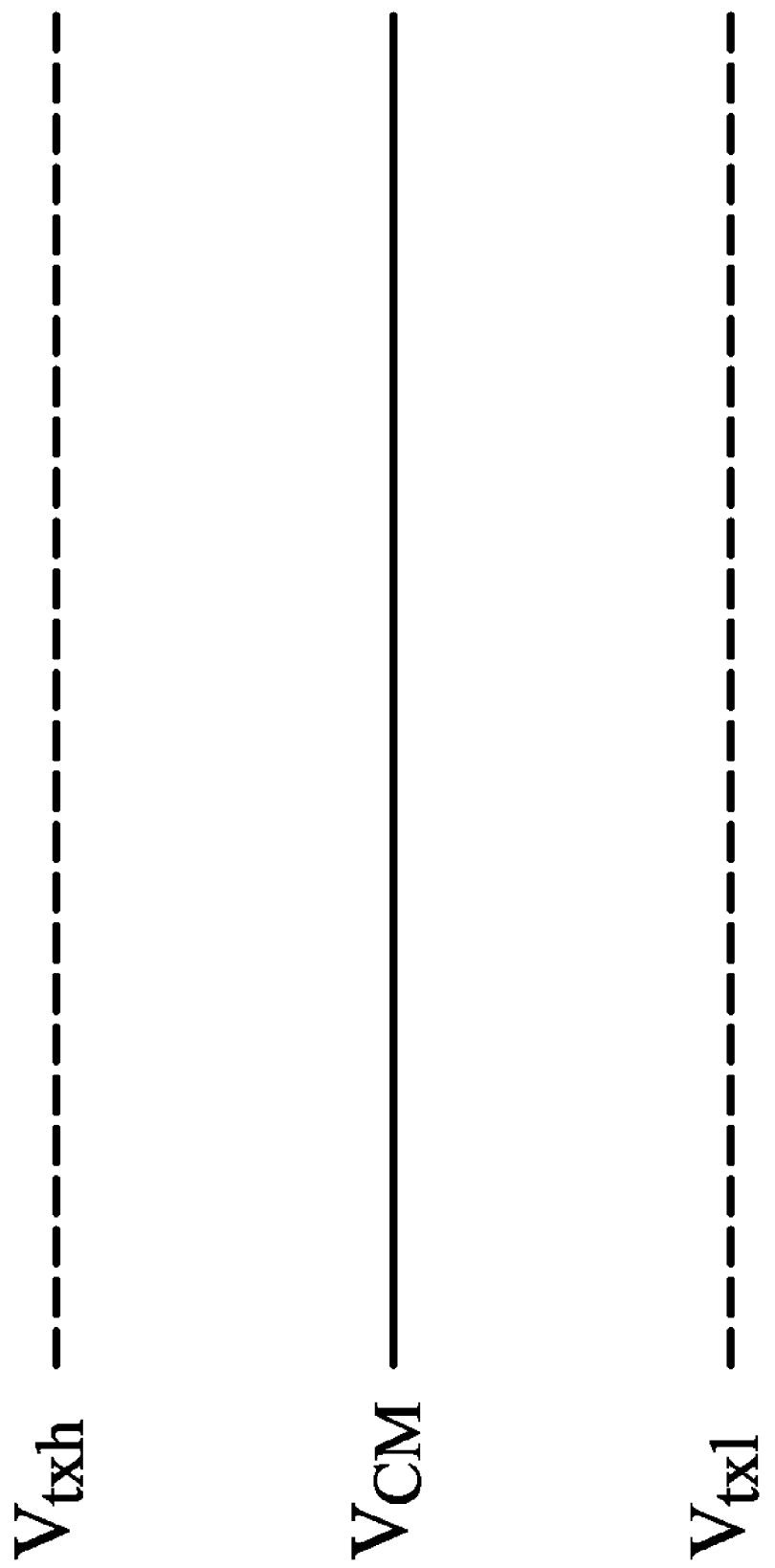
FIG. 3 shows the operation voltages of the TX+ and TX− transmission lines.

FIG. 3 shows the operation voltages of the TX+ and TX− transmission lines, which includes a differential high voltage $V_{txh}$, a differential low voltage $V_{txl}$ and a common mode voltage $V_{CM}$. The differential high voltage $V_{txh}$, differential low voltage $V_{txl}$ and common mode voltage $V_{CM}$ are designed according to the USB 3.0 protocol. In a normal operation state (U0 state), the voltages of the TX+ and TX− transmission lines toggle between the differential high voltage $V_{txh}$ and the differential low voltage $V_{txl}$ at a rate of 5 Gb/s.

Referring back to FIG. 2, prior to the EPHY module 206, the USB device 204 may further comprise a receiving circuit (RX, not shown) receiving the signals at the TX+ and TX− transmission lines. The output of the receiving circuit RX is coupled to the EPHY layer 206. The EPHY module 206 determines the voltage levels of the TX+ and TX− transmission lines, and a clock data recovery (CDR) circuit (not shown) is in the EPHY module 206 to extract a recovery clock and data from the signals on the TX+ and TX− transmission lines. The LPHY module 208, coupled to the output of the EPHY module 206, may interpret the data according to the recovery clock.

The LPHY module 208 comprises a plurality of logic circuits. The LPHY module 208 outputs an indication signal 216 according to the recovery clock and data transmitted in the TX+ and TX− transmission lines. When USB transmission of the host 202 is disabled (the host 202 is in a connection disable state as know as SS.Disabled state), the EPHY layer 206 cannot extract the recovery clock and data from the TX+ and TX− transmission lines. Because no recovery clock is available, the LPHY module 208 cannot interpret data transmitted in the TX+ and TX− transmission lines. To indicate that no recovery clock is available, the LPHY module 208 sets the indication signal 216 to be a predetermined value.

The link layer module 210 is coupled to the LPHY module 208. The link layer module 210 compares the indication signal 216 with the predetermined value. When the indication signal 216 has been maintained at the predetermined value over a predetermined time period, the link layer module 210 makes the state machine 214 leave a normal operation state (a U0 state).

Compared with conventional techniques, the state of the USB device 204 according to the invention is further dependent on the state of the host 202. When the host 202 disables the USB transmission, the USB device 204 accordingly leaves the normal operation (U0 state). Because the USB device 204 is not unnecessarily in the normal operation state (U0 state), power consumption is reduced.

In the embodiment shown in FIG. 2, the link layer module 210 comprises a comparator 218 and a counter 220. The comparator 218 compares the indication signal 216 with the predetermined value. The counter 220 is coupled to the comparator 218 to estimate how long the indication signal 216 has been maintained at the predetermined value. When the counter 220 shows that the indication signal 216 has been maintained at the predetermined value over the predetermined time period, the state machine 214 is made to leave the normal operation state (U0 state).

In an exemplary embodiment, the predetermined time period may be 1024 T, wherein 1 T is 8 ns or any other value. The indication signal 216 may be realized by various forms.

For example, the indication signal 216 may include two portions: a first bus signal (may be named PHYLS_RXD); and a second bus signal (may be named PHYLS_RXDISK). The first bus signal PHYLS_RXD is 32 bits. The second bus signal PHYLS_RXDISK is 4 bits. When no recovery clock is available, the LPHY module 208 sets the first bus signal PHYLS_RXD to be a first value and sets the second bus signal PHYLS_RXDISK to be a second value. The first and second values form the predetermined value. In an embodiment of the invention, the 32 bits first value is 0, and the 4 bits second value is represented as 1111 b.

Figure 4:
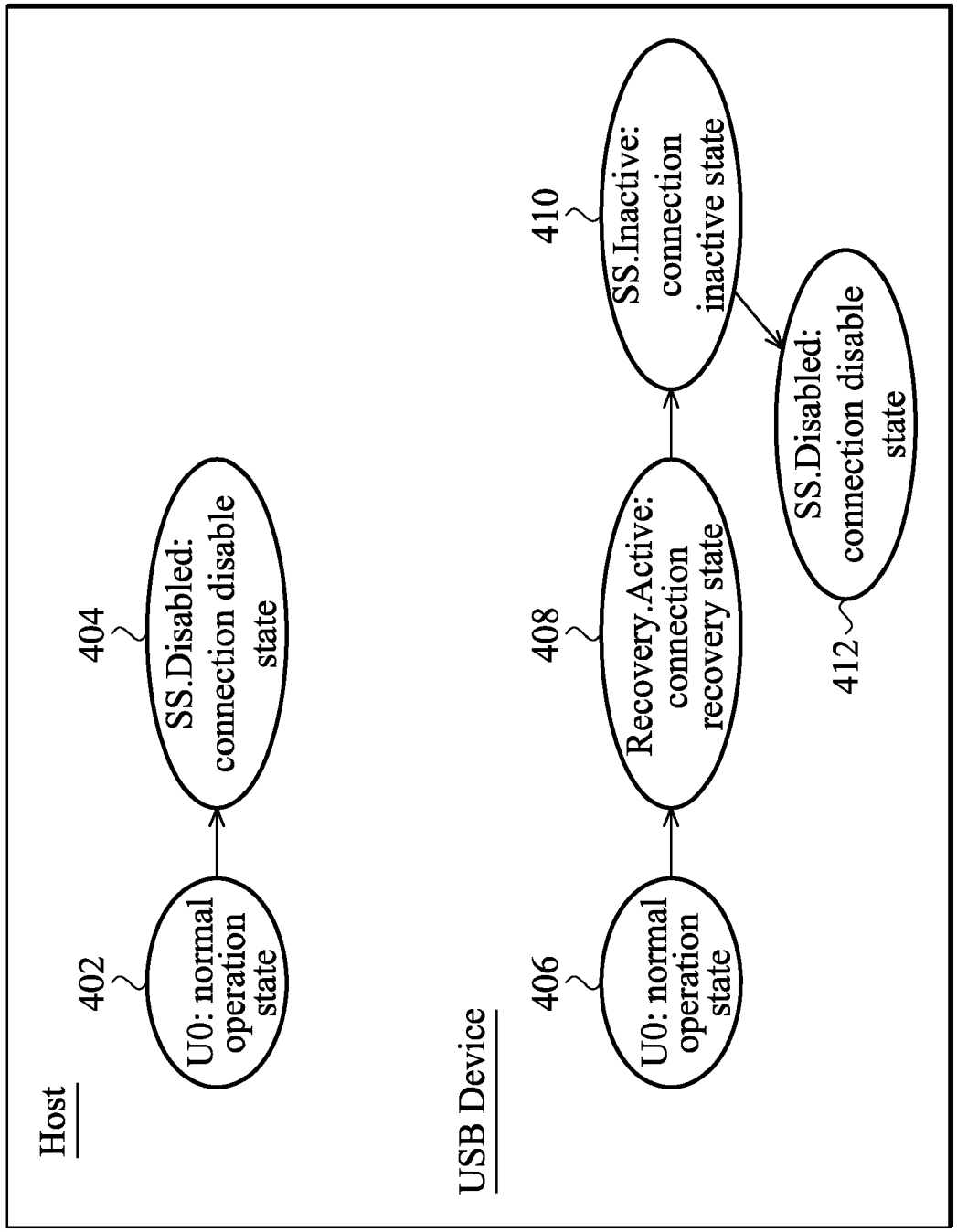
FIG. 4 shows a state machine diagram of a host and a USB devices according to the invention.

In other exemplary embodiments, when the indication signal 216 is maintained at the predetermined value over the predetermined time period, the link layer module 210 not only makes the state machine 214 leave the normal operation state (U0 state) but also make the state machine 214 enter a connection recovery state (Recovery.Active state). In the connection recovery state (Recovery.Active state), the USB device 204 outputs a training sequence (training sequence 1, TS1) to wait for a response from the host 202. The related state machine diagram is shown in FIG. 4.

The invention provides a novel USB design for reducing power consumption. FIG. 4 shows a state machine diagram of the host 202 and the USB devices 204 according to the invention. At the beginning, the host 202 is in a normal operation state (U0 state) 402. Then, the user disables the USB transmission of the host 202 so that the host 202 is switched to a connection disable state (SS.Disabled state) 404. In the connection disable state (SS.Disabled state) 404, the TX+ and TX− transmission lines do not contain the recovery clock and data. Thus, the clock data recovery (CDR) circuit in the EPHY module 206 of the USB device 204 cannot extract the recovery clock and data from the TX+ and TX− transmission lines, and accordingly the LPHY module 208 of the USB device 204 can not detect a recovery clock and thus sets the indication signal 216 to be the predetermined value. When detecting that the indication signal 216 has been maintained at the predetermined value for longer than the predetermined time period, the link layer module 210 of the USB device 204 switches the state machine 214 from a normal operation state (U0 state) 406 to a connection recovery state (Recovery.Active state) 408 to output a training sequence (TS1) to wait for a response from the host 202. Because the host 202 is in the connection disable state (SS.Disabled state) 404, the host 202 does not respond to the training sequence (TS1). Thus, the USB device 204 further switches to the connection inactive state (SS.Inactive state) 410 to check the status of the host 202. However, the USB device 204 cannot detect the host 202 (the host 202 is not available) because the host 202 is in the connection disable state (SS.Disabled state) 404. Thus, the USB device 204 further switches to a connection disable state (SS.Disabled state) 412. According to the state control mechanism disclosed in FIG. 4, the USB device 204 is rapidly directed to the connection disable state (SS.Disabled state) 412 when the USB transmission of the host 202 is disabled, thus power consumption is dramatically reduced.

Figure 5:
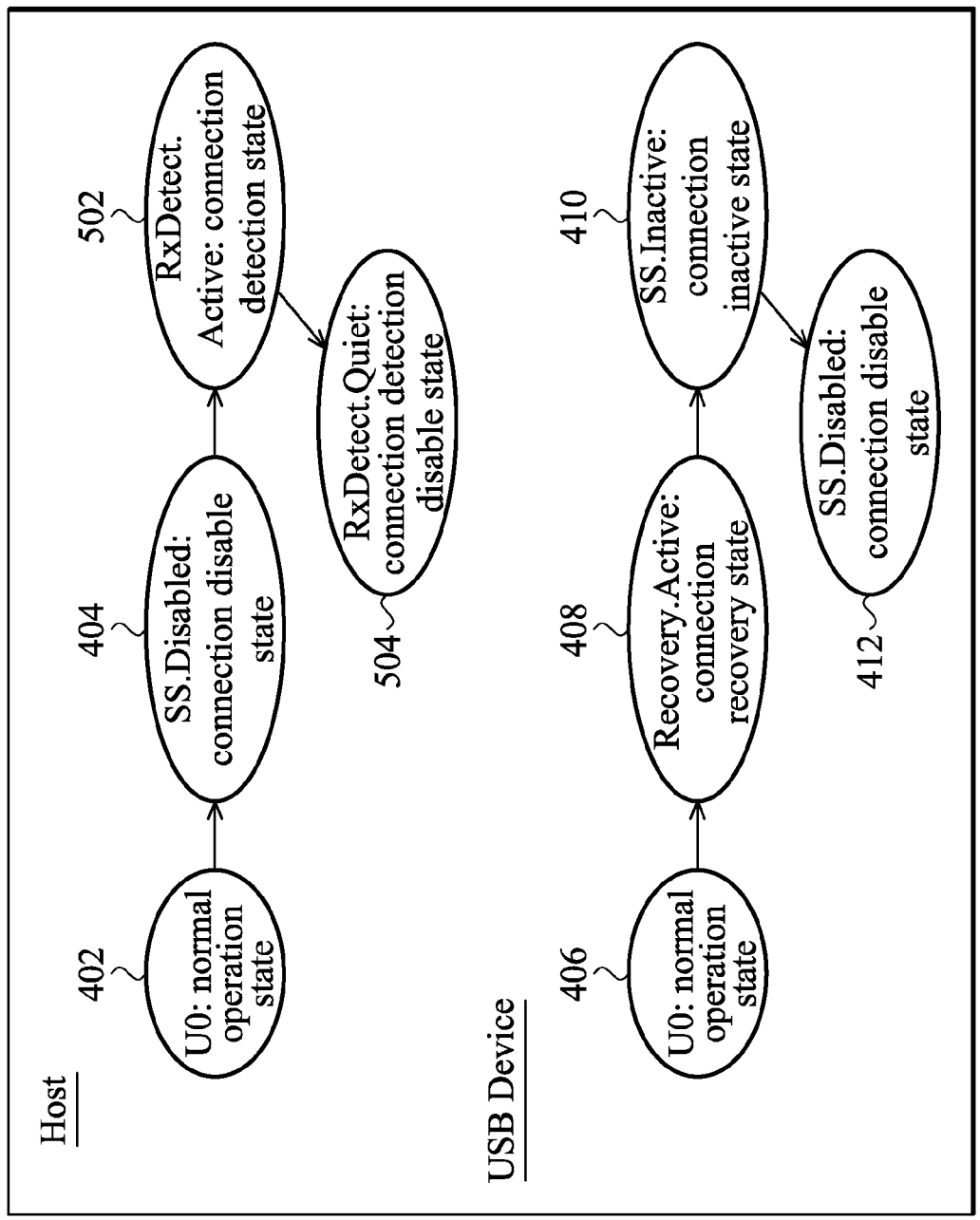
FIG. 5 shows another state machine diagram of a host and a USB device according to the invention.

FIG. 5 shows another state machine diagram of the host 202 and the USB device 204 according to the invention. Compared with FIG. 4, the USB transmission of the host 202 is rebooted later. As shown, the host 202 is switched from the connection disable state (SS.Disabled state) 404 to a connection detection state (RxDetect.Active state) 502. In the connection detection state (RxDetect.Active state) 502, the host 202 checks the USB device 204. Because the USB device 204 has been switched to the connection disable state (SS.Disabled state) 412, the host 202 switches from the connection detection state (RxDetect.Active state) 502 to a connection detection disable state (RxDetect.Quiet state) 504. Thus, no more energy is wasted in the USB device checking (the connection detection state, RxDetect.Active state, 502).

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded to the broadest interpretation so as to encompass all such modifications and similar arrangements.

What is claimed is:

1. A universal serial bus (USB) device, comprising:
   an electrical physical layer module, reading voltages of first and second transmission lines to extract a recovery clock and data from the first and second transmission lines;
   a logical physical layer module, detecting the recovery clock and data from the electrical physical layer module to output an indication signal and, when no recovery clock is available, the logical physical layer module sets a voltage value of the indication signal to be a predetermined value; and
   a link layer module, having a state machine defining link connectivity and link power management of the USB device,
   wherein the link layer module compares the voltage value of the indication signal with the predetermined value and makes the state machine leave a normal operation state when the voltage value of the indication signal has been maintained at the predetermined value over a predetermined time period;
   wherein the indication signal comprises a first bus signal and a second bus signal, and when no recovery clock is available, the logical physical layer module sets a voltage value of the first bus signal to be a first value and sets a voltage value of the second bus signal to be a second value, and the predetermined value is formed by the first value and the second value.

2. The USB device as claimed in claim 1, wherein the first and second transmission lines are TX+ and TX− transmission lines of a USB cable.

3. The USB device as claimed in claim 1, wherein the link layer module further makes the state machine enter a connection recovery state when the indication signal has been maintained at the predetermined value over the predetermined time period and, in the connection recovery state, the USB device outputs a training sequence to wait for a host to respond thereto.

4. The USB device as claimed in claim 3, wherein the link layer module switches the state machine from the connection recovery state to a connection inactive state when the training sequence is not responded thereto by the host, and, in the connection inactive state the USB device checks the status of the host.

5. The USB device as claimed in claim 4, wherein the link layer module switches the state machine from the connection inactive state to a connection disable state when the host is not available.

6. The USB device as claimed in claim 1, wherein the link layer module further comprises:
    a comparator, comparing the indication signal with the predetermined value; and
    a counter, coupled to the comparator to estimate how long the indication signal has been maintained at the predetermined value, wherein the estimated result is used in controlling the state machine.

7. The USB device as claimed in claim 1, wherein the first bus signal is 32 bits and the second bus signal is 4 bits.

8. The USB device as claimed in claim 7, wherein the first value of 32 bits is '0' and the second value is 1111b.

9. The USB device as claimed in claim 1, wherein the USB device is capable of connecting to a host, and when the host is switched to a connection disable state, the voltages of first and second transmission lines does not contain the recovery clock and the data.

10. A universal serial bus (USB) system, comprising:
    a host;
    a USB cable; and
    a USB device, to be connected to the host by the USB cable and comprising:
    an electrical physical layer module, reading voltages of first and second transmission lines to extract a recovery clock and data;
    a logical physical layer module, detecting the recovery clock and data from the electrical physical layer module to output an indication signal, and, when no recovery clock is available, the logical physical layer module sets a voltage value of the indication signal to be a predetermined value; and
    a link layer module, having a state machine defining link connectivity and link power management of the USB device,
    wherein the link layer module compares the voltage value of the indication signal with the predetermined value and makes the state machine leave a normal operation state when the voltage value of the indication signal has been maintained at the predetermined value over a predetermined time period;
    wherein the indication signal comprises a first bus signal and a second bus signal, and when no recovery clock is available, the logical physical layer module sets a voltage value of the first bus signal to be a first value and sets a voltage value of the second bus signal to be a second value, and the predetermined value is formed by the first value and the second value.

11. The system as claimed in claim 10, wherein the first and second transmission lines are TX+ and TX− transmission lines of the USB cable.

12. The system as claimed in claim 10, wherein the link layer module further makes the state machine enter a connection recovery state when the indication signal has been maintained at the predetermined value over the predetermined time period, and, in the connection recovery state, the USB device outputs a training sequence to wait for the host to respond thereto.

13. The system as claimed in claim 12, wherein the link layer module switches the state machine from the connection recovery state to a connection inactive state when the host does not respond to the training sequence, and, in the connection inactive state, the USB device checks status of the host.

14. The system as claimed in claim 13, wherein the link layer module switches the state machine from the connection inactive state to a connection disable state when the host is not available.

15. The system as claimed in claim 10, wherein the link layer module further comprises:
    a comparator, comparing the indication signal with the predetermined value; and
    a counter, coupled to the comparator to estimate how long the indication signal has been maintained at the predetermined value, wherein the estimated result is used in controlling the state machine.

16. The system as claimed in claim 10, wherein the first bus signal is 32 bits and the second bus signal is 4 bits.

17. The system as claimed in claim 16, wherein the first value of 32 bits is '0' and the second value is 1111b.

18. The system as claimed in claim 10, wherein when the host is switched to a connection disable state, the voltages of first and second transmission lines does not contain the recovery clock and the data.

* * * * *